U S008836585B2

(12) United States Patent
Häkli et al.

(10) Patent No.: US 8,836,585 B2
(45) Date of Patent: Sep. 16, 2014

(54) RADIO-FREQUENCY TRANSPONDER FOR MARKING WOOD PRODUCTS AND METHOD OF MANUFACTURING THEREOF

(75) Inventors: Janne Häkli, Espoo (FI); Kaarle Jaakkola, Helsinki (FI); Kaj Nummila, Espoo (FI); Juha-Matti Saari, Espoo (FI); Kari Kolppo, Tampere (FI)

(73) Assignees: Teknologian Tutkimuskeskus VTT, Espoo (FI); Tampere University of Technology, Tampere (FI)

( * ) Notice: Subject to any disclaimer, the term of this patent is extended or adjusted under 35 U.S.C. 154(b) by 592 days.

(21) Appl. No.: 13/141,190

(22) PCT Filed: Dec. 17, 2009

(86) PCT No.: PCT/FI2009/051008
§ 371 (c)(1),
(2), (4) Date: Aug. 31, 2011

(87) PCT Pub. No.: WO2010/072890
PCT Pub. Date: Jul. 1, 2010

(65) Prior Publication Data
US 2011/0304513 A1 Dec. 15, 2011

(30) Foreign Application Priority Data
Dec. 22, 2008 (FI) ..................................... 20086222

(51) Int. Cl.
*H01Q 1/24* (2006.01)
(52) U.S. Cl.
USPC ........................................... 343/702; 343/841
(58) Field of Classification Search
USPC .......... 343/10.1, 702, 841, 700 MS, 767, 600
See application file for complete search history.

(56) References Cited

U.S. PATENT DOCUMENTS

| 7,417,550 B2 * | 8/2008 | Brown et al. ............ 340/572.7 |
| 2002/0170213 A1 | 11/2002 | Latschbacher et al. |
| 2006/0145860 A1 * | 7/2006 | Brown et al. ............ 340/572.7 |

(Continued)

FOREIGN PATENT DOCUMENTS

| DE | 10 2006 015 899 A1 | 10/2007 |
| EP | 0 535 912 A2 | 4/1993 |

(Continued)

OTHER PUBLICATIONS

Gjerdrum., "RFID Tags Applied for Tracing Timber in the Forest Products Chain", http://www.skogoglandskap.no/filearchive/pgj_rfid_and_timber_tracing_denmark09.pdf>HaettuinternetistäJune. 11, 2009.

(Continued)

*Primary Examiner* — Thien M Le
(74) *Attorney, Agent, or Firm* — Birch, Stewart, Kolasch & Birch, LLP

(57) ABSTRACT

The invention relates to a transponder for marking wood material and a method of manufacturing thereof. The method comprises embedding an RFID microchip and antenna into a casing essentially consisting of one or more biodegradable materials. According to the invention the embedding step comprises forming the antenna by layering conductive material directly on biodegradable material, and covering the antenna by biodegradable material. By means of the invention, environmentally friendly and pulping-compatible transponders can be manufactured, for example, for aiding the logistics of forest industry.

23 Claims, 2 Drawing Sheets

(56) References Cited

U.S. PATENT DOCUMENTS

2011/0254665 A1* 10/2011 Lindsay et al. ............ 340/10.5
2011/0304513 A1* 12/2011 HaKli et al. ................ 343/702
2012/0050011 A1*  3/2012 Forster ...................... 340/10.1

FOREIGN PATENT DOCUMENTS

| EP | 1 246 152 A1 | 10/2002 |
|----|--------------|---------|
| FR | 2 673 026 A1 | 8/1992 |
| FR | 2 810 436 A1 | 12/2001 |
| FR | 2 885 723 A1 | 11/2006 |
| FR | 2 913 134 A1 | 8/2008 |
| WO | WO 2006/068688 A1 | 6/2006 |
| WO | WO 2007/115786 A1 | 10/2007 |
| WO | WO 2009/050337 A1 | 4/2009 |

OTHER PUBLICATIONS

International Search Report, PCT/FI2009/051008, Apr. 8, 2010.

GAO Tek Inc., "GA0211 RFID Nail Transponder Tag", morerfid.com, 1 page, http://morerfid.com/details.php?subdetail=Product&action=details&product_id=193&display=RFID, as available on Nov. 27, 2008.

Garrett, "Transponders for Timber Management", United States Department of Agriculture, Forest Service, Mar. 1997, 6 pages, http://www.fs.fed.us/eng/pubs/html/97241303/97241303.html, as available on Nov. 27, 2008.

Indisputable Key, "Transponder Applicator", 1 page, http://www.indisputablekey.com/glossary/transponder_applicator.php, as available on Aug. 29, 2011.

* cited by examiner

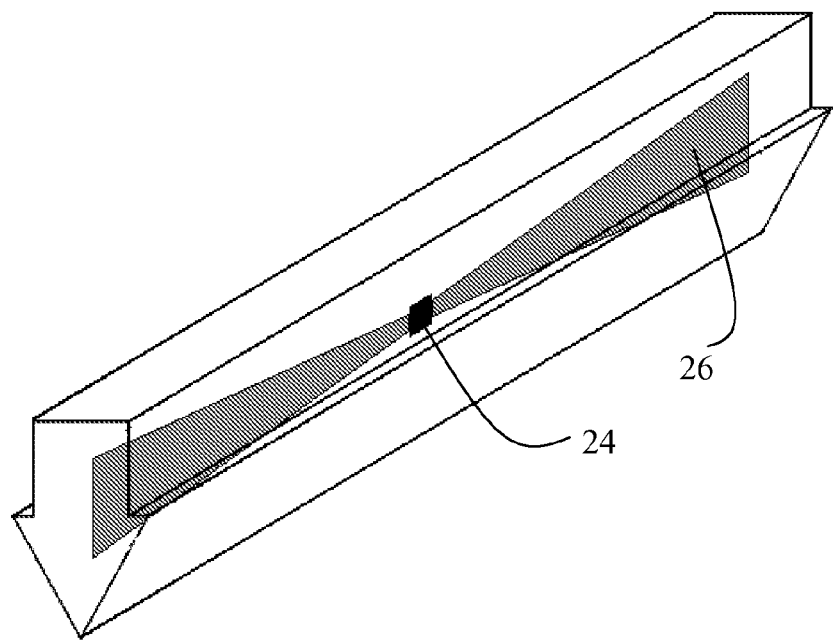
Fig. 3
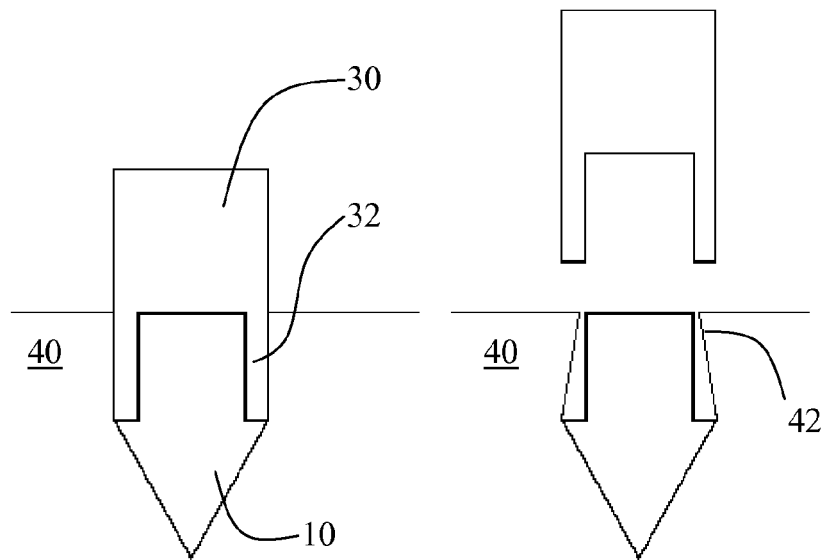
Fig. 4A
Fig. 4B

RADIO-FREQUENCY TRANSPONDER FOR MARKING WOOD PRODUCTS AND METHOD OF MANUFACTURING THEREOF

FIELD OF THE INVENTION

The invention relates to a special designed radio-frequency transponder and a method of manufacturing the transponder. The transponder of the present kind comprises a casing manufactured from biodegradable material and radio-frequency transponder means covered by the casing.

BACKGROUND OF THE INVENTION

Radio-frequency identification (RFID)-based tracing is becoming increasingly common in many fields of trade and industry. Although many industrial sectors have utilized tracing systems, covering the product chain from the supplies of raw materials to the final products in the market, the forestry and wood sector is still in the beginning of this process partly due to a complicated supply chain structure. The nature of logging operation itself, logistics of the forest industry, environmental factors, needs of the user of the logs and the demanding electromagnetic properties of wood set special requirements for the transponder application process and transponders itself, only to mention some aspects. The general objective in this sector is to develop methodology and advanced technologies that can improve the use of wood and optimize the forest production through the chain of transformation, minimizing environmental impacts (www.indisputablekey.com).

Two main types of RFID transponders (tags) are known that can be used for marking logs (http://www.indisputable-key.com/transponder_applicator.php): a patch type transponder, which is inserted into a slot or groove machined into the log, and a nail type transponder, which is inserted into a hole drilled into the wood or hammered directly into the wood. Patch transponders typically have the form of a rectangular slab. Further examples of known marking devices are known from FR 2673026, FR 2885723, FR 2913134, and FR 2810436, which disclose a devices that can be inserted into wood and separate transponders, which can be inserted and removed to and from a separate space of the device reserved for that purpose. Thus, the transponders are not integral parts of the device, which makes their use unnecessarily complex.

It would be beneficial in many applications that the transponder would not need to be removed from the wood product before further processing of the wood, such as pulping, paper making, burning or composting. Thus, the transponders should contain as little non-biodegradable materials as possible.

SUMMARY OF THE INVENTION

It is an aim of the invention to achieve a method of manufacturing an environmentally friendly RFID transponder and a novel RFID transponder obtainable using the method. In particular, it is an aim to manufacture a transponder which can be easily used to mark logs and which does not need to be removed from logs before processing of the logs.

The invention is based on the idea of applying the antenna of the transponder directly on biodegradable material forming part of the casing of the transponder. The antenna is embedded within the casing by bringing more biodegradable material to the partial casing containing the antenna in order to complete the casing. Molding can be used both for manufacturing the partial casing and for completing the casing. As a result, the antenna of the transponder together with an RFID microchip electrically connected to the antenna, become sandwiched into the biodegradable casing material. Provided that molding, thermocompression or some other method is used for completing the casing, a unitary and environmentally friendly transponder is formed.

More specifically, the method and transponder according to the invention are characterized by what is stated in the independent claims.

According to a preferred embodiment, the method comprises manufacturing a radio-frequency indentification (RFID) transponder suitable for marking wood material by embedding an RFID microchip and antenna into a casing essentially consisting of one or more biodegradable materials. The embedding comprises

- forming the antenna by layering conductive material directly on biodegradable material, and
- covering the antenna by biodegradable material.

According to one embodiment, the embedding step comprises

- providing a first casing part made of biodegradable matrix material and comprising an inner surface,
- applying the antenna directly onto said inner surface by layering conductive material onto the inner surface, and
- completing the casing by joining a second casing part to the inner surface of the first casing part such that the RFID microchip and the antenna are embedded within the casing.

Correspondingly, the transponder according to the invention comprises a body made of biodegradable, preferably moldable material, an RFID microchip embedded within the body, and a layer-like antenna electrically connected to the RFID microchip. According to a preferred embodiment, the antenna is from both sides thereof in direct contact with the biodegradable material. The layer is typically planar but it may also have a three-dimensional shape, if desired.

Considerable advantages are obtained by means of the invention, as the amount of non-biodegradable materials can be very low. Such materials are typically contained only in the actual transponding means, i.e., the antenna and the microchip and, optionally, the thin substrate the antenna is applied on. Even if a non-biodegradable substrate is used, it may be very thin so that the amount of non-biodegradable materials remains negligible as concerns the possibility to process the tagged wood material as such for example in a pulping process. Preferably, the weight of the antenna substrate is less than 5%, typically less than 1% of the total weight of the transponder.

In its preferred form, the need of using separate substrate for the antenna and/or the RFID microchip, or at least non-biodegradable substrates, is completely removed. Conventional inlays comprising the antenna pattern are typically manufactured from PP, PET or Kapton. These materials are not fully biodegradable and their use in forest industry is very limited. On the other hand, known biodegradable materials are not suitable for making a thin, resilient and heat stable film which can be used in molding or thermocompression processes. The invention solves these problems by suggesting a direct-application method for the antenna pattern. It has been observed in experiments that current biodegradable matrix materials of the transponder casing, containing natural polymers and natural fibers (such as Arboform® by Tecnaro GmbH), are suitable substrates for both for film transfer technology previously used for plastic substrates and printing technology previously used for plastic and paper substrates.

According to a preferred embodiment of the invention, the biodegradable matrix material of the transponder and/or the substrate the antenna is applied on is pulping compatible, that is, suitable to be added in minor amounts with the other raw materials into mechanical, chemimechanical or chemical pulping processes. A pulping compatible material fragments or dissolves during the pulping process, leaving behind no components detrimental to the process. In particular, such materials do not have a negative effect on the quality of paper manufactured from logs marked with transponders made of such materials. Such materials typically consist essentially of natural components and, optionally, other additives inherently present in pulp and/or recovered in standard pulping processes.

According to one embodiment, the transponder is at least partly wedge-shaped, that is, shaped so as to penetrate to wood without pre-processing of the wood by drilling or engraving, for example. The transponder can be nail-like, the wedging being on an end of an elongated body, or "horizontally" applicable, the wedging being on an elongated edge of the transponder. According to another embodiment, the transponder is non-wedged, whereby a cavity needs to be fabricated to wood for the transponder. Such transponder can be used, for example, as a dowel for fastening wooden parts together in e.g. furniture industry.

Further embodiments and advantages of the invention are described with reference to the attached drawings.

BRIEF DESCRIPTION OF DRAWINGS

FIG. 3 illustrates in a perspective view the transponder of FIG. 1 and an RFID antenna and chip buried therein, FIGS. 4A and 4B show in cross-sectional views two main stages of the application process of the transponder according to one embodiment of the invention.

DETAILED DESCRIPTION OF EMBODIMENTS

Figure 1:
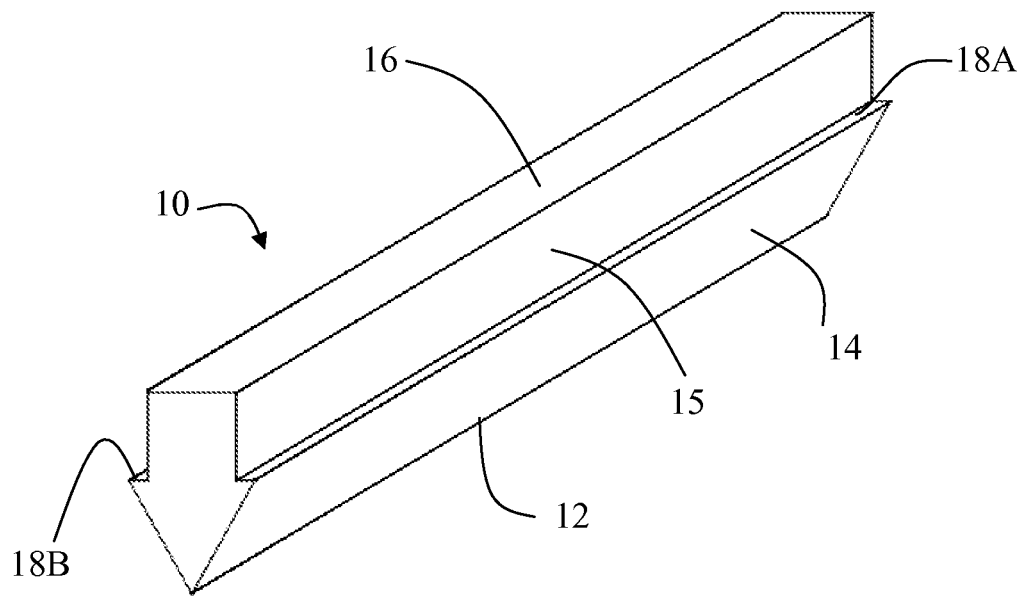
FIG. 1 illustrates in a perspective view a transponder according to one embodiment of the invention.

FIG. 1 shows a wedge-shaped transponder 10 according to one embodiment of the invention. The transponder 10 is elongated in one direction and comprises a first edge 12 on a longitudinal side thereof, the first edge 12 being adapted to penetrate to wood foremost. The transponder 10 further comprises an elongated wedge-shaped first portion 14 extending from the first edge 12 in order to displace wood while the first edge 12 penetrates into the wood. The transponder further comprises a second portion 15, which extends from the wedge-shaped first portion 14 away from the first edge 12 and forms the second edge 16 of the transponder.

According to one embodiment, the casing comprises one or more shoulders or recesses extending perpendicular to the insertion direction of the transponder for efficiently preventing disengagement of the transponder from the wood material after insertion. This is because after displacement of the wood material during penetration of the wedge-shaped part of the transponder, the resilient wood material expands as it tries to return to its original shape, thus locking the transponder firmly to the wood.

Figure 2:
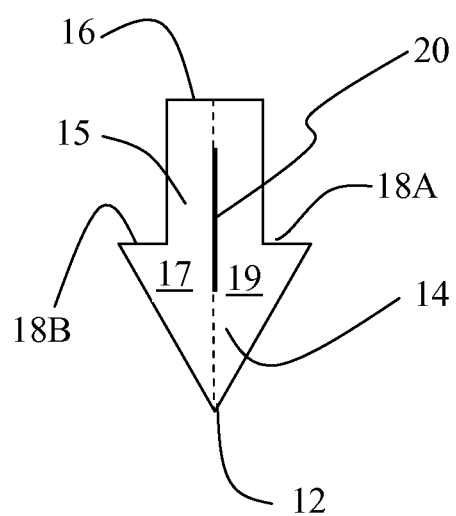
FIG. 2 shows a cross-sectional view of the transponder illustrated in FIG. 1.

According to the embodiment shown in FIG. 1, the wedge-shaped first portion 14 has a maximum width in the lateral direction, which is greater than the maximum width of the second portion 15. In other words, there are formed two shoulders 18A, 18B extending in the lateral direction of the transponder at the region between the wedge-shaped first portion 14 and the second portion 15. The purpose of the shoulder is to hold the transponder firmly in the wood after application of the transponder. The shoulders 18A, 18B are preferably also wedge-shaped to provide easy insertion and increased mechanical backward resistance. As is shown in FIG. 2, the cross-section of the transponder of FIG. 1 is arrow-like, the first portion 14 being essentially triangular and the second portion 15 being essentially rectangular. This results in a wood-penetrating but still well-staying geometry of the transponder casing. According to a preferred embodiment, the opening angle of the wedge-shaped portion 14 is 40-75 degrees, in particular 50-65 degrees. At least for certain sorts of wood, an opening angle of about 58 degrees has been found to be well suitable.

The dimension of the "horizontal"-type transponder in the longitudinal direction is typically at least 2, preferably at least 4 times the dimension of the transponder in the insertion direction, thus giving the transponder an elongated shape. The longitudinal dimension of the tag may be, for example, 30-150 mm, in particular 50-100 mm. The lateral width of the transponder (from shoulder 18A to shoulder 18B) is typically 3-10 mm, in particular 4-6 mm and the height of the transponder 4-20, in particular 6-12 mm. The width of the shoulder is preferably at least 0.5 mm for providing strong fixation of the transponder to wood. There are several variations to the above-described casing geometry. In particular, the shoulders may be supplemented or replaced with other forms of local holding means interacting with the wood. For example, there may be provided more shoulders on lateral sides and/or longitudinal ends of the casing. In addition or alternatively, there may be provided one or more recesses, such as grooves, on sides or ends of the casing, to which the resilient wood can enter and thus hold the transponder within the wood. In addition or alternatively, the casing may be manufactured from high-friction material and/or have a roughened zone which locally increases friction between the wood and the transponder.

More generally, a "horizontal" transponder comprises a rigid casing adapted to be inserted in an insertion direction into wood material by means of impact, the casing comprising a wedge-shaped first edge adapted to penetrate into the wood material due to said impact, and a second edge opposite to the first edge, the first and second edges defining said insertion direction, and radio-frequency transponding means covered by the casing, the casing being elongated in a direction perpendicular to the insertion direction.

As shown in FIGS. 2 and 3, the radio-frequency circuitry 20, i.e., an RFID microchip 24 and an antenna 26, are contained within the casing of the transponder 10, thus being well protected. According to a preferred embodiment, the antenna 26 extends primarily in the longitudinal direction of the transponder (the longitudinal dimension of the transponder defining the maximum length of the antenna 26). As shown in FIG. 3, the antenna may also have a significant dimension in the insertion direction of the transponder. According to the embodiment shown, the antenna 26 is a dipole consisting of two triangular branches extending into opposite directions from the microchip 24. However, a rectangular dipole antenna is expected to perform at least as well. As appreciated by a person skilled in the art, the shaping of the antenna 26 and positioning of the antenna 26 and the microchip 24 within the transponder may vary a lot.

The microchip 24 and the antenna 26 are integrally formed and completely contained within the transponder casing. This means that that it is impossible to remove the microchip 24 and antenna 26 without breaking the transponder. Preferably, the microchip 24 and the antenna 26 are buried within the casing material by molding, e.g. injection or compression molding or extrusion of the casing, but the burying can also be realized by attaching separately molded casing halves together by for example thermocompression or using biodegradable adhesive.

According to one embodiment, the microchip 24 and the antenna 26 are contained on a separate preferably biodegradable substrate so as to form an inlay which is inserted into the casing during the manufacture of the casing. According to one embodiment, the inlay is placed on the first casing half which is attached to a second casing half with or without an adhesive in order to make a complete casing. According to an alternative embodiment, the inlay is buried into the casing material during molding of the casing. An adhesive may be used to attach the inlay but this is not necessary.

According to one embodiment, the substrate of the inlay is a paper substrate. According to another embodiment, the substrate is made of artificial wood. According to a yet another embodiment, the substrate is made of biodegradable polymer, such as polylactide (PLA) or polyhydroxyalkanoate (PHA).

According to alternative embodiment, the substrate is made of non-biodegradable polymer, such as PP, PET or Kapton. It is preferable that the substrate is thin, typically having a thickness less than 0.1 mm, so that is total mass remains low.

With reference to FIG. 2, the casing is manufactured as two or more parts, which are in the end product inseparably joined to each other. The first casing part is denoted with the reference numeral 17. The second casing part is denoted with the reference numeral 19 and the border between the parts 17, 19 is illustrated with dashed line. The dashed line indicated thus the location of the inner surface of the first casing part 17 before the casing is completed. The RFID antenna layer 20 is resides on the inner surface.

According to a preferred embodiment, the transponder in elongated and the antenna resides at a longitudinal cross section, typically at a symmetry axis of the casing.

The antenna 26 is typically formed of metal or metal-containing material. According to one embodiment, the antenna is applied by transferring a metallic pre-patterned film onto the matrix material of the casing or the separate substrate by film transfer technology, such as the Aspact® technology by Aspact Oy, Finland. The film transfer process typically comprises providing a transfer foil comprising a carrier foil and the pattern to be transferred, placing the transfer foil onto the casing part receiving the pattern, pressing the foil against the casing part under elevated temperature in order to transfer the pattern to the casing part, and removing the carrier foil.

According to alternative embodiment, the antenna pattern is applied on the casing or the separate substrate by printing metal-containing ink to the casing. Many types of suitable conductive inks are known in the art. Typically the metal particles are thereafter sintered so as to increase the conductivity of the printed layer. Sintering may take place under heat and, optionally, pressure, or by electrical interaction, for example, as described in EP 2001272 of the same applicant.

According to yet another embodiment, the antenna pattern is applied by depositing metal particles in a process free from liquid-form solvents onto the desired inner surface of the casing or the separate substrate so that they form bonds on the surface and form a unitary conductive layer. This can be achieved, for example, by the atomic layer deposition (ALD) method, the chemical vapour deposition (CVD) method or thermal spraying for example according to the Direct-Write technology of MesoScribe Technologies, Inc. If required, excess areas of the layer deposited can be removed to form the final antenna pattern.

The RFID microchip can be embedded to the first casing part before the deposition of the antenna, whereby the antenna and microchip are electrically connected during of after the deposition. This may be carried out by transferring the antenna film or printing the printing ink such that it overlaps with the contact terminals of the microchip even without separate connecting step. However, soldering or other bonding process can be utilized too. Alternatively, the RFID microchip can be provided to the first casing part and electrically connected with the antenna only after the deposition of the antenna. Known bonding processes can be used.

The matrix material forming the casing is preferably pulping-compatible material and may comprise or essentially consist of natural polymer such as lignin and natural fibers, in particular wood fibres. Such materials are frequently referred to as artificial wood materials. There generally have the properties of being moldable, rigid, durable and moisture-resistant, which makes them very suitable for marking wood. The matrix material is preferably non-absorbing for water. That is, the transponder remains water-free within normal humidity and temperature ranges logs are subjected to during storage and transportation.

According to one embodiment, the matrix material comprises additionally to or instead of lignin other biodegradable polymer, such as PLA, optionally reinforced by natural fibers.

The principle of the application of the transponder shown in FIGS. 1-3 is shown in FIGS. 4A and 4B. In the first stage, the transponder 10 is hit into the wood 40 with the application tool 30 and in the second stage the application tool 30 is removed in order to let the resiliency of the wood 40 to lock the transponder 10 into the wood 40. As is shown in the figure, the application tool 30 comprises a recess defined by narrow regions 32 of material surrounding the recess. These regions preferably have the thickness smaller than or equal to the width of the shoulders of the transponder (if present). The recess is shaped such that the non-wedged second portion of the transponder intimately mates with the application tool 30. The recess may also be designed to have a tight fit such that the transponder 10 stays well in the application tool 30 before application.

The invention claimed is:

1. A method of manufacturing a radio-frequency identification (RFID) transponder suitable for marking a wood material and comprising an RFID microchip and a layer-like antenna, the method comprising:

providing a first casing part with an elongate shape made of biodegradable material and with an inner surface, providing the layer-like antenna to the inner surface of the first casing part to extend in its elongate direction, joining a second elongated casing part made of biodegradable material to the inner surface of the first casing part such that said RFID chip and said antenna is sandwiched between the casing parts, and forming a completed rigid casing having a wedge-shaped edge in its elongate direction, wherein said rigid casing is operable to penetrate into the wood material by impact in a direction perpendicular to its elongate direction.

2. The method according to claim 1, wherein the antenna is formed by layering conductive material directly on the inner surface of the first casing part for forming a casing essentially consisting of one or more biodegradable materials.

3. The method according to claim 1, wherein said providing step that provides the layer-like antenna to the inner surface of the first casing part comprises
applying the antenna onto a separate substrate, and
placing the separate substrate with the antenna onto said inner surface.

4. The method according to claim 3, wherein the separate substrate is biodegradable.

5. The method according to claim 1, wherein the biodegradable material(s) of the first and second casing parts is/are moldable.

6. The method according to claim 5, comprising joining the second casing part to the first casing part by molding.

7. The method according to claim 1, comprising joining the first and second casing parts using adhesive or thermocompression.

8. The method according to claim 1, wherein the RFID microchip is embedded to the first casing part before providing the antenna and the antenna and microchip are electrically connected during or after the application.

9. The method according to claim 1, wherein the RFID microchip is provided and electrically connected with the antenna after the antenna has been provided on the first casing part.

10. The method according to claim 1, wherein the antenna is provided on the first casing part by transferring a metallic pre-patterned film onto the biodegradable material by film transfer technology.

11. The method according to claim 1, wherein the antenna is provided on the first casing part by printing metal-containing ink or the like to the biodegradable material, and letting the ink or the like dry.

12. The method according to claim 1, wherein the first and second casing parts essentially consists of pulping-compatible material.

13. The method according to claim 1, wherein the casing comprises biodegradable polymer.

14. The method according to claim 1, wherein an elongated casing is manufactured the antenna being applied on an inner surface residing on a longitudinal cross section of the casing.

15. A radio-frequency transponder for marking wood material, comprising:
a rigid casing comprising elongate first and second casing parts made of one or more biodegradable materials and joined together along an elongate surface of each part, and
an RFID microchip and a layer-like antenna electrically connected to the RFID microchip sandwiched between the surfaces of said first and second casing parts,
wherein the rigid casing has a wedge-shaped edge in its elongate direction and is operable to penetrate into the wood material by impact in a direction perpendicular to its elongate direction.

16. The radio-frequency transponder according to claim 15, wherein the antenna is both sides thereof in direct contact with said one or more biodegradable materials.

17. The radio-frequency transponder according to claim 15, wherein the transponder casing is made of pulping-compatible material.

18. The transponder according to claim 15, wherein the biodegradable material is substantially non-absorbing for water.

19. The transponder according to claim 15, wherein the transponder casing is essentially free of non-biodegradable materials.

20. The transponder according to claim 15, wherein the antenna is metal-containing and applied directly on an inner surface of the biodegradable material by film transfer technology, by printing or by particle deposition.

21. The transponder according to claim 15, wherein the antenna is applied on a separate planar substrate, which is sandwiched between the one or more biodegradable materials.

22. The transponder according to claim 15, wherein the transponder casing is cylindrical or wedge-shaped.

23. The transponder according to claim 15, wherein the transponder casing is made of moldable material.

* * * * *